US012664774B2

(12) United States Patent
Barros et al.

(10) Patent No.: US 12,664,774 B2
(45) Date of Patent: Jun. 23, 2026

(54) CYCLING PERFORMING IMAGE CLASSIFICATION BASED ON USER FAMILIARITY

(71) Applicant: GOOGLE LLC, Mountain View, CA (US)

(72) Inventors: Brett Barros, San Mateo, CA (US); Megan Fazio, Mountain View, CA (US)

(73) Assignee: Google LLC, Mountain View, CA (US)

( * ) Notice: Subject to any disclaimer, the term of this patent is extended or adjusted under 35 U.S.C. 154(b) by 377 days.

(21) Appl. No.: 18/248,148

(22) PCT Filed: Oct. 13, 2020

(86) PCT No.: PCT/US2020/070658
§ 371 (c)(1),
(2) Date: Apr. 6, 2023

(87) PCT Pub. No.: WO2022/081191
PCT Pub. Date: Apr. 21, 2022

(65) Prior Publication Data
US 2023/0410498 A1    Dec. 21, 2023

(51) Int. Cl.
*G06V 10/96* (2022.01)
*G06F 9/451* (2018.01)
(Continued)

(52) U.S. Cl.
CPC .............. *G06V 10/96* (2022.01); *G06F 9/453* (2018.02); *G06V 10/17* (2022.01); *G06V 10/764* (2022.01)

(58) Field of Classification Search
CPC ...... G06V 10/96; G06V 20/17; G06V 10/764; G06F 9/453
(Continued)

(56) References Cited

U.S. PATENT DOCUMENTS 7,885,438 B2 * 2/2011 Uppaluri ............... G06T 7/0012
382/128
10,884,680 B2 1/2021 Kaneda
(Continued)

FOREIGN PATENT DOCUMENTS

CN 105867720 A 8/2016
CN 107517310 A 12/2017
(Continued)

OTHER PUBLICATIONS

International Search Report and Written Opinion for PCT Application No. PCT/US2020/070658, mailed on Jul. 8, 2021, 15 pages.
(Continued)

*Primary Examiner* — Gabriel I Garcia
(74) *Attorney, Agent, or Firm* — Brake Hughes Bellermann LLP

(57) ABSTRACT

A computing system can perform image classification within a displayed image, while performing the image classification, determine that a first object of an object class is present within the displayed image, present a prompt within the displayed image, receive, in response to the prompt, a selection of the first object from a user, in response to receiving the selection of the first object, perform a function on the first object, based on the selection of the first object in response to the prompt, determine that the user is familiar with the function, based on determining that the user is familiar with the function, terminate performing image classification within the displayed image, and in response to the user selecting a second object of the object class within the displayed image, perform the function on the second object.

25 Claims, 11 Drawing Sheets

(51) Int. Cl.
　　*G06V 10/10* 　　　　(2022.01)
　　*G06V 10/764* 　　　　(2022.01)

(58) Field of Classification Search
　　USPC .......................................................... 382/312
　　See application file for complete search history.

(56) References Cited

U.S. PATENT DOCUMENTS

| 2008/0068469 | A1* | 3/2008 | Takagi ................. G11B 27/322 348/E5.042 |
| 2008/0282204 | A1 | 11/2008 | Del |
| 2013/0272587 | A1 | 10/2013 | Paladini et al. |
| 2015/0331711 | A1 | 11/2015 | Huang et al. |
| 2016/0217794 | A1 | 7/2016 | Imoto et al. |
| 2017/0168709 | A1 | 6/2017 | Zhong et al. |
| 2018/0314980 | A1 | 11/2018 | Osotio et al. |
| 2019/0318405 | A1 | 10/2019 | Hu et al. |
| 2020/0293821 | A1* | 9/2020 | Price ....................... G06F 18/24 |

FOREIGN PATENT DOCUMENTS

| CN | 108537086 | A | 9/2018 |
| CN | 111274842 | A | 6/2020 |
| JP | H03221354 | A | 9/1991 |
| JP | 2007213183 | A | 8/2007 |
| JP | 2013082538 | A | 5/2013 |
| JP | 2013161406 | A | 8/2013 |
| JP | 2019181866 | A | 10/2019 |
| JP | 2020021354 | A | 2/2020 |
| KR | 20130077773 | A | 7/2013 |
| KR | 20140088597 | A | 7/2014 |
| KR | 20190138888 | A | 12/2019 |
| WO | 2009111499 | A2 | 9/2009 |
| WO | 2019051293 | A1 | 3/2019 |
| WO | 2019061293 | A1 | 4/2019 |

OTHER PUBLICATIONS

Sang, et al., "Interaction Design for Mobile Visual Search", IEEE Transactions on Multimedia, vol. 15, Issue: 7, Jun. 14, 2013, pp. 1665-1676.

* cited by examiner

Electronic
Device
100

Display
102

Object
104A

Electronic
Device
100

Display
102

Object
104A

Select this object to 'X'

Prompt
106

Electronic
Device
100

Display
102

Object
104A

Selection
108A

Select this object to 'X'

Prompt
106

Electronic
Device
100

Display
102

Transformed
object
110A

Electronic
Device
100

Display
102

Object
104B

Electronic
Device
100

Display
102

Object
104B

Selection
108B

Electronic
Device
100

Display
102

Transformed
object
110B

Electronic
Device
100

| Image presenter 202 | Prompt generator 214 |
|---|---|
| Image classifier 204 | Selection processor 216 |
| Class library 206 | Function processor 218 |
| Image detector 208 | |
| Familiarity determiner 210 | Processor 220 |
| Context processor 212 | Memory 222 |
| | Input/output 224 |

CYCLING PERFORMING IMAGE CLASSIFICATION BASED ON USER FAMILIARITY

CROSS REFERENCE TO RELATED APPLICATION

This application is a 35 U.S.C. § 371 National Stage Entry Application from PCT/US2020/070658, filed Oct. 13, 2023, designating the U.S., the disclosure of which is incorporated herein by reference in its entirety.

TECHNICAL FIELD

This description relates to performing functions on images.

BACKGROUND

Various functions, such as optical character recognition or scanning, can be performed on image files. Constantly performing image classification on the files to determine functions that can be performed can consume computing resources.

SUMMARY

According to an example, a non-transitory computer-readable storage medium comprising instructions stored thereon. When executed by at least one processor, the instructions can be configured to cause a computing system to perform image classification within a displayed image, while performing the image classification, determine that a first object of an object class is present within the displayed image, generate a prompt, receive, a selection of the first object from a user, in response to receiving the selection of the first object, perform a function on the first object, based on the selection of the first object, determine that the user is familiar with the function, based on determining that the user is familiar with the function, terminate performing image classification within the displayed image, and in response to receiving a selection of a second object of the object class within the displayed image, perform the function on the second object.

According to an example, a computing system can include at least one processor, and a non-transitory computer-readable storage medium comprising instructions stored thereon. When executed by the at least one processor, the instructions can be configured to cause the computing system to perform image classification within a displayed image, while performing the image classification, determine that a first object of an object class is present within the displayed image, generate a prompt, receive a selection of the first object from a user, in response to receiving the selection of the first object, perform a function on the first object, based on the selection of the first object, determine that the user is familiar with the function, based on determining that the user is familiar with the function, terminate performing image classification within the displayed image, and in response to receiving a selection of a second object of the object class within the displayed image, perform the function on the second object.

A can include performing, by a computing system, image classification within a displayed image, while performing the image classification, determining that a first object of an object class is present within the displayed image, generating a prompt, receiving a selection of the first object from a user, in response to receiving the selection of the first object, performing a function on the first object, based on the selection of the first object, determining that the user is familiar with the function, based on determining that the user is familiar with the function, terminating performing image classification within the displayed image, and in response to receiving a selection of a second object of the object class within the displayed image, performing the function on the second object.

The details of one or more implementations are set forth in the accompanying drawings and the description below. Other features will be apparent from the description and drawings, and from the claims.

BRIEF DESCRIPTION OF THE DRAWINGS

Like reference numbers refer to like elements.

DETAILED DESCRIPTION

An electronic device, such as a smartphone, either on its own or in communication with a server, can perform functions on objects and/or images displayed by the electronic device. The functions can include, for example, performing optical character recognition (OCR) on text included in the image, scanning documents included in the image, identifying persons, animals, or monuments included in the image, initiating communication (such as an email or telephone call) based on contact information included in the image, or decoding a barcode included in the image. One or more of these functions can be performed within a visual searching application. One or more of these functions can be performed in connection with an augmented reality environment and/or application.

A user may not initially know which functions the electronic device can perform on objects within images (e.g., images captured during an augmented reality interaction and/or session). The electronic device can teach and/or train the user that the electronic device can perform a function(s) on an object by performing image classification on the object and, if the electronic device can perform a function on an object class that the electronic device determines that the object belongs to, present a prompt for the user to select the object. The user can interact with and/or select either or both of the prompt and object. The electronic device can perform the function on the object in response to the user selecting the object. One or more of these features described above can be performed in connection with a visual search (e.g., an augmented reality visual search).

Performing image classification can consume computing resources, such as processor resources, memory resources, and/or draining a battery of the electronic device. To reduce the consumption of computing resources, the electronic device can stop and/or terminate performing the image classification when the user has become familiar with the function. The electronic device can determine that the user is familiar with the function based on the electronic device's history of receiving a selection of an object to prompt the electronic device to perform the function, and/or the electronic device's history of presenting prompts to the user. The user can still select an object without a prompt, and/or without the electronic device performing image classification, and the electronic device can respond to receiving the selection of the object by performing the function that corresponds to the object class of the selected object. In some examples, the electronic device can perform image classification on the selected object after receiving the selection of the object.

Figure 1A:
FIG. 1A shows an electronic device presenting a first object within a display.

FIG. 1A shows an electronic device 100 presenting a first object 104A within a display 102. The electronic device 100 can include, for example, a smartphone, a tablet computer, a phablet, a notebook or laptop computer, or a desktop computer, as non-limiting examples.

The electronic device 100 can include a display 102. The display 102 can present, display, and/or output graphical output and/or one or more images. In some examples, display 102 can include a touchscreen that receives and/or processes touch input from a user.

The image displayed and/or presented by the display 102 can include one or more objects 104A. The object(s) 104A can include, for example, text, a barcode and/or Quick Response (QR) code, a document such as a text document or image document, a person, and animal, or a monument, as non-limiting examples.

The electronic device 100 can perform image classification on portions of the image presented by the display 102, and/or on one or more objects, such as the object 104A, included in the image presented by the display 102. The electronic device 100 can determine whether an object, such as the object 104A, is of an object class, that the electronic device 100 can perform a function on. In some examples, the electronic device 100 can determine whether any objects of multiple object classes are present within the image displayed by the display 102. In some examples, each object class can correspond to a single function that the electronic device 100 can perform on an object. In some examples, one or more functions can be performed on objects of more than one object class. In this example, the electronic device 100 determines that the object 104A is a member of an object class, and/or that the object 104 of the object class is present within the image displayed by the display 102.

Figure 1B:
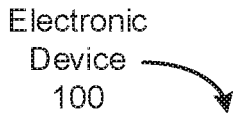
FIG. 1B shows the electronic device presenting a prompt associated with the first object.
Figure 1B:
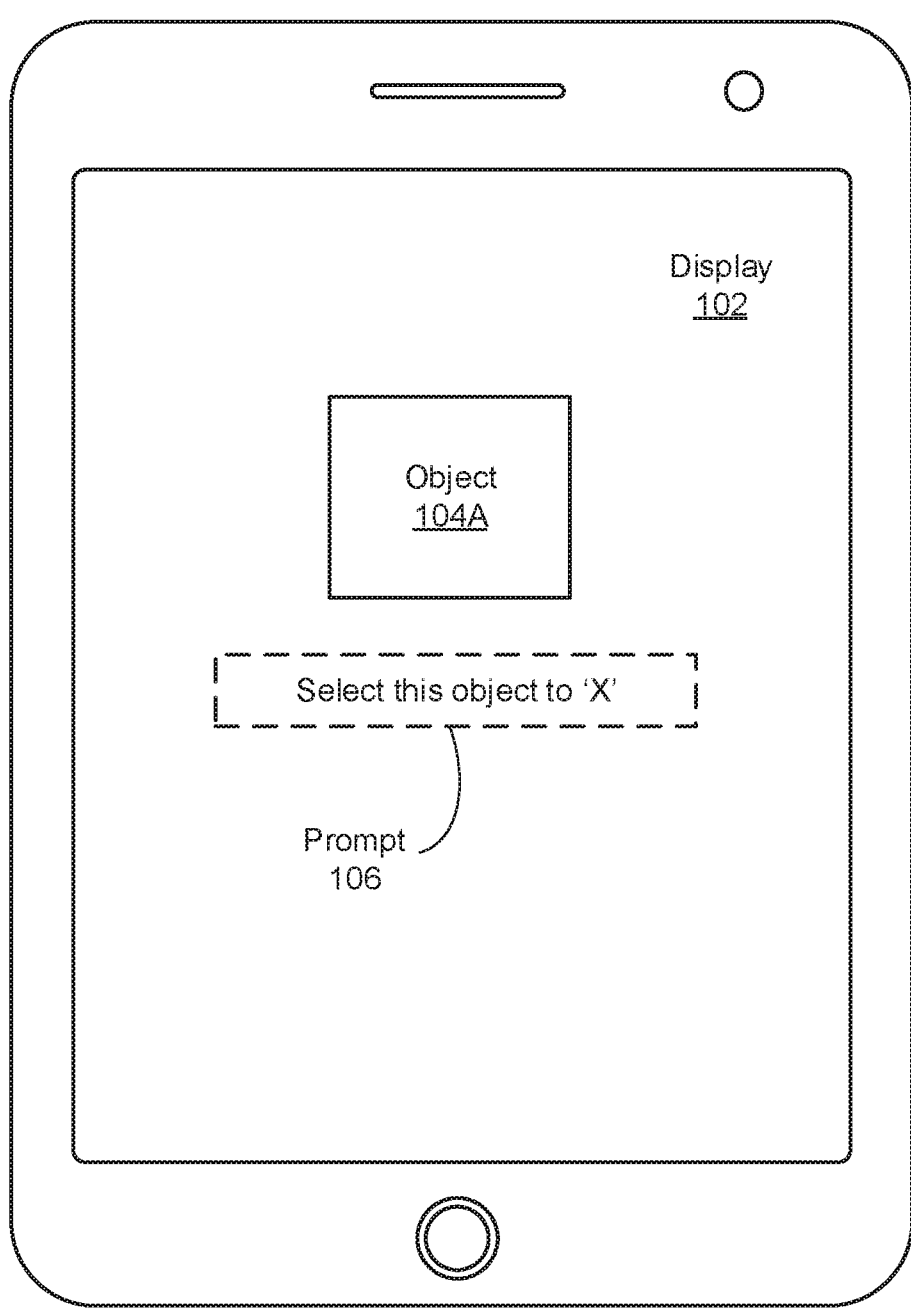

FIG. 1B shows the electronic device 100 presenting a prompt 106 associated with the first object 104A. Presenting the prompt within the display is an example of generating a prompt. Other examples of generated prompts include auditory and/or spoken prompts (such as a voice speaking the words instead of an/or in addition to the text), and/or haptic feedback from the display 102. The prompt 106 can indicate the function that the electronic device 100 will perform on the first object 104A in response to the user selecting the first object 104A. The prompt can be informational, indicating a function that the electronic device 100 can perform. The prompt 106 can, for example, indicate that the electronic device 100 will initiate a telephone call or email to a telephone number or email address included in the object 104A, will scan and/or decode a barcode or QR code included in the object 104A, perform optical character recognition (OCR) on text included in the object 104A, scan a document included in the object 104A, identify a person and/or human included in the object 104A, identify a type and/or breed of animal included in the object 104A, and/or identify a monument or point of interest included in the object 104A.

The user can respond to the prompt 106 by selecting the object 104A. The user can select the object 104A by inputting a predetermined gesture into the display 102 in examples in which the display 102 is a touchscreen. Examples of predetermined gestures include tapping on a portion of the display 102 presenting the object 104A and/or tapping and holding a finger on the portion of the display 102 presenting the object 104A. Examples of selecting the object 104A when an input device such as a computer mouse is available include clicking on the mouse and/or double-clicking on the mouse when a cursor is located on the portion of the display 102 presenting the object 104A.

Figure 1C:
FIG. 1C shows the electronic device with a user selecting the first object.
Figure 1C:
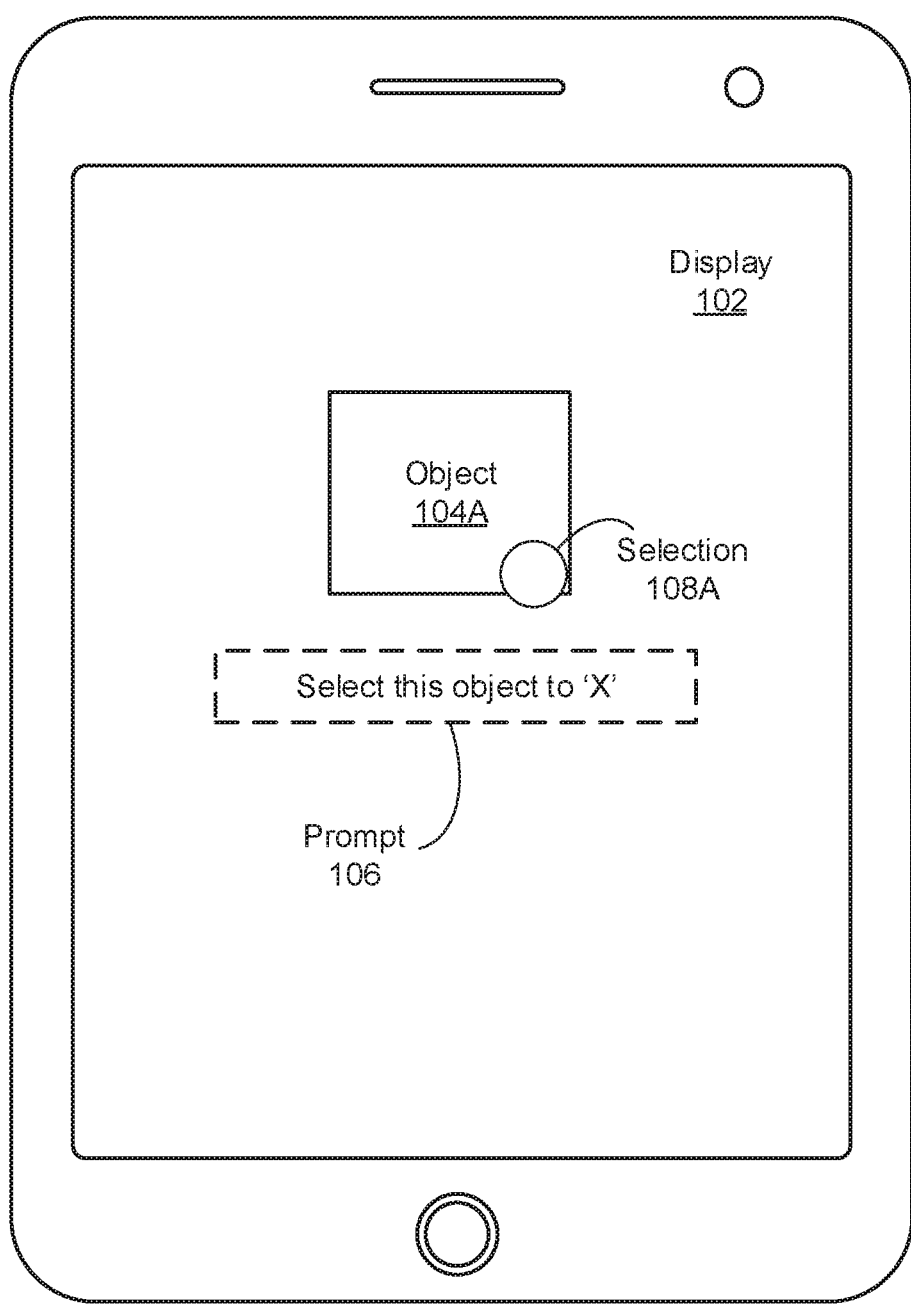

FIG. 1C shows the electronic device 100 with a user selecting the first object 104A. A selection 108A of the object 104A by the user can be performed by the user tapping, and/or tapping and holding, the portion of the display 102 presenting the object 104A. The selection 108A can easily disambiguate and/or specify the object on which the function is to be performed. The electronic device 100 can receive and/or process the selection 108A. In response to receiving and/or processing the selection 108A, the electronic device 100 can perform a function. The function performed by the electronic device 100 can be based on the object class that the electronic device 100 determined that the object 104A belonged to when the electronic device 100 performed image classification. In some examples, the electronic device 100 can transform the object 104A by performing the function.

Figure 1D:
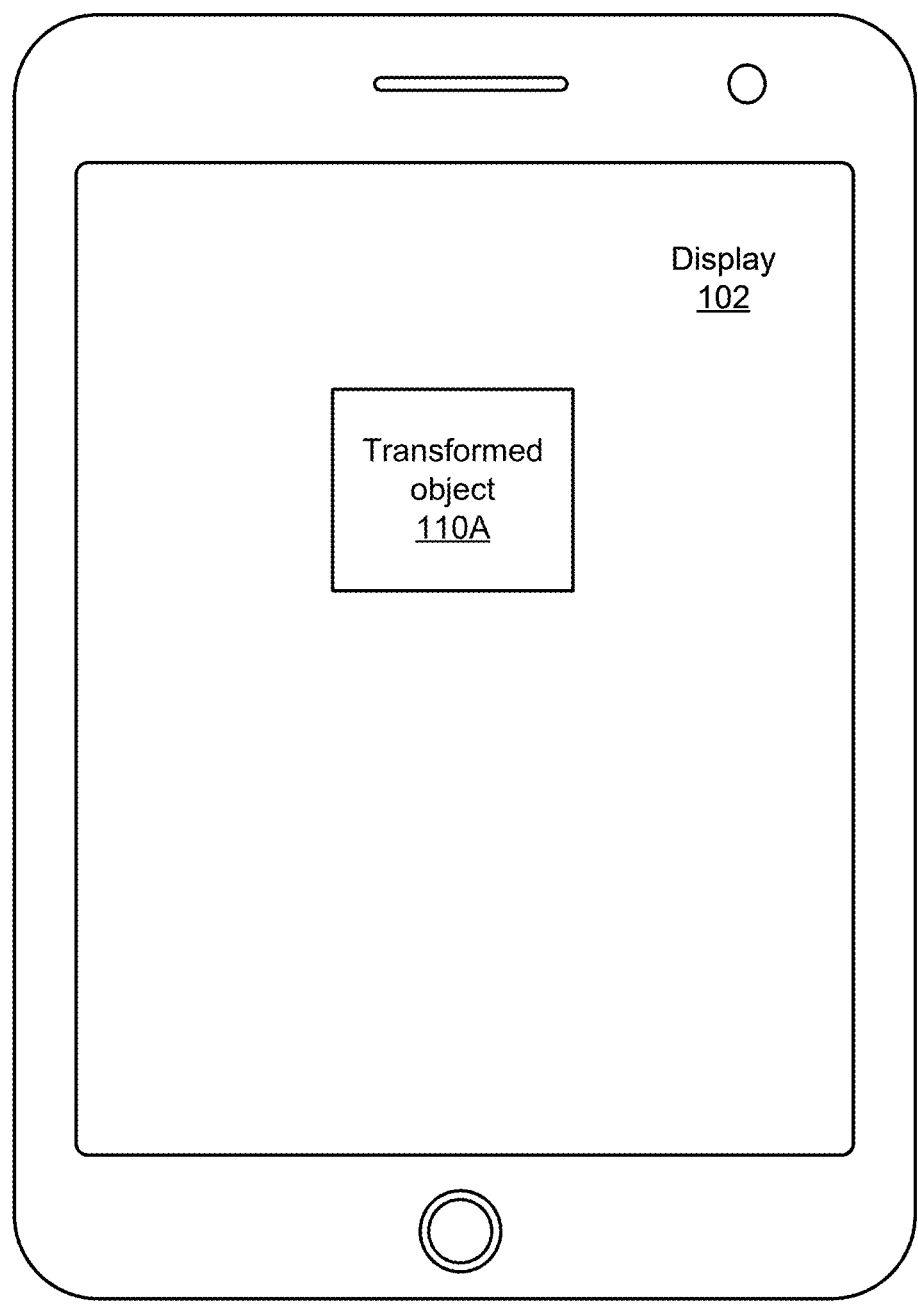
FIG. 1D shows the electronic device after a function has been performed on the first object.

FIG. 1D shows the electronic device 100 after a function has been performed on the first object 104A (not shown in FIG. 1D). The function can transform the first object 104A into a first transformed object 110A. In some examples in which the object class of the first object 104A was a telephone number, the function can include initiating a call to the telephone number and the transformed object 110A can include a visual indicator that a telephone call is being performed. In some examples in which the object class of the first object 104A was an email address, the function can include beginning drafting an email to the email address and the transformed object 110A can include a blank email with the email address from the first object 104A in a 'to' line of the blank email. In some examples in which the object class of the first object 104A was a barcode or QR code, the function can include decoding the barcode or QR code and the transformed object 110A can include a text description of the item identified by the barcode or QR code included in the first object 104A and/or an image of the item identified by the barcode or QR code included in the first object 104A. In some examples in which the object class of the first object 104A includes text, the function can include performing optical character recognition on the text and the transformed object 110A can include the recognized text from the first object 104A in a different, more readable format. In some examples in which the object class of the first object 104A was an indicator of a document, the function can include scanning the document and the transformed object 110A can include an indicator that the document from the first object 104A was scanned. In some examples in which the object class of the first object 104A was a person, an animal, or a monument or landmark, the function can include identifying the person and/or human, animal, monument, or landmark, and the transformed object 110A can include a text description or and/or name of the person, animal, monument, or landmark included in the first object 104A.

After being presented with the prompt 106, performing the selection 108A of the first object 104A, and seeing the result of the function and/or the transformed object 110A, the user may become familiar with the function and no longer need the prompt 106 to select an object for the electronic device 100 to perform a function on. The electronic device 100 can determine that the user is familiar with the function based on receiving the selection 108A of the object 104A included in an object class associated with the function. In one embodiment the determination of familiarity may depend on the number of selections 108A of the first object 104A, in particular the number of selections 108A of the first object 104A in a predetermined time interval. If the electronic device 100 receives selections 108A a number to times, the electronic device 100 may determine, and/or it may be assumed, that the user has a certain familiarity with the selection. Another criterion to determine the familiarity might be the time between the display of the object 104A and the selection 108A is made, the familiar the user might be with it. These criteria can be used in combination and these are examples used in connection with the familiarity determiner 210 described further below.

Based on determining that the user is familiar with the function, the electronic device 100 can terminate and/or stop performing image classification and/or not present a prompt 106 to the user.

Figure 1E:
FIG. 1E shows the electronic device presenting a second object within the display.

FIG. 1E shows the electronic device 100 presenting a second object 104B within the display 102. The image presented by the display 102 in FIG. 1E, including the second object 104B, can be different than the image presented by the display in FIG. 1A. The second object 104B can be of the same object class as the first object 104A, and/or the object class of the second object 104B can be associated with the same function that was performed on the first object 104A. Based on the electronic device's 100 determination that the user is familiar with the object class and/or the function performed on the first object 104A, the electronic device 100 will terminate performing image classification and/or will not present a prompt 106 for the user to request the function to be performed on the second object 104B. Based on the user's familiarity with the function, the user can select the object 104B without a prompt 106.

Figure 1F:
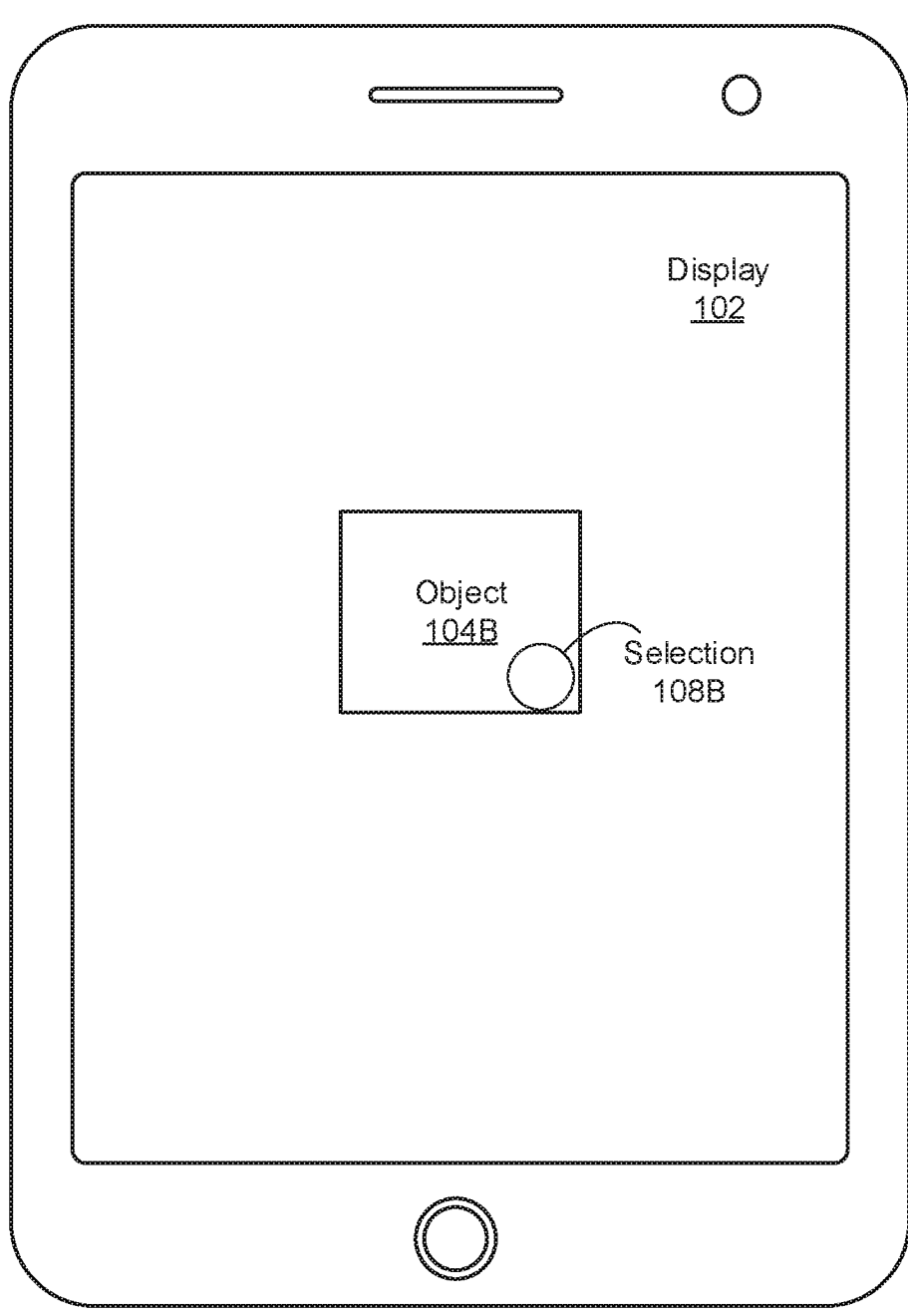
FIG. 1F shows the electronic device with the user selecting the second object.

FIG. 1F shows the electronic device 100 with the user selecting the second object 104B. The user can input the selection 108B in a similar manner to inputting the selection 108A without a prompt 106 based on the user's familiarity with the function. The electronic device 100 can receive the selection of the object 104B. Based on receiving the selection of the object 104B, the electronic device 100 can perform image classification on the object 104B and/or determine that the object 104B is of the same object class as the object 104A. Based on determining that the object 104B is of the object class, the electronic device 100 can receive the selection 108B and perform the function associated with the object class of the object 104B in a similar manner to the function performed with respect to the object 104A.

Figure 1G:
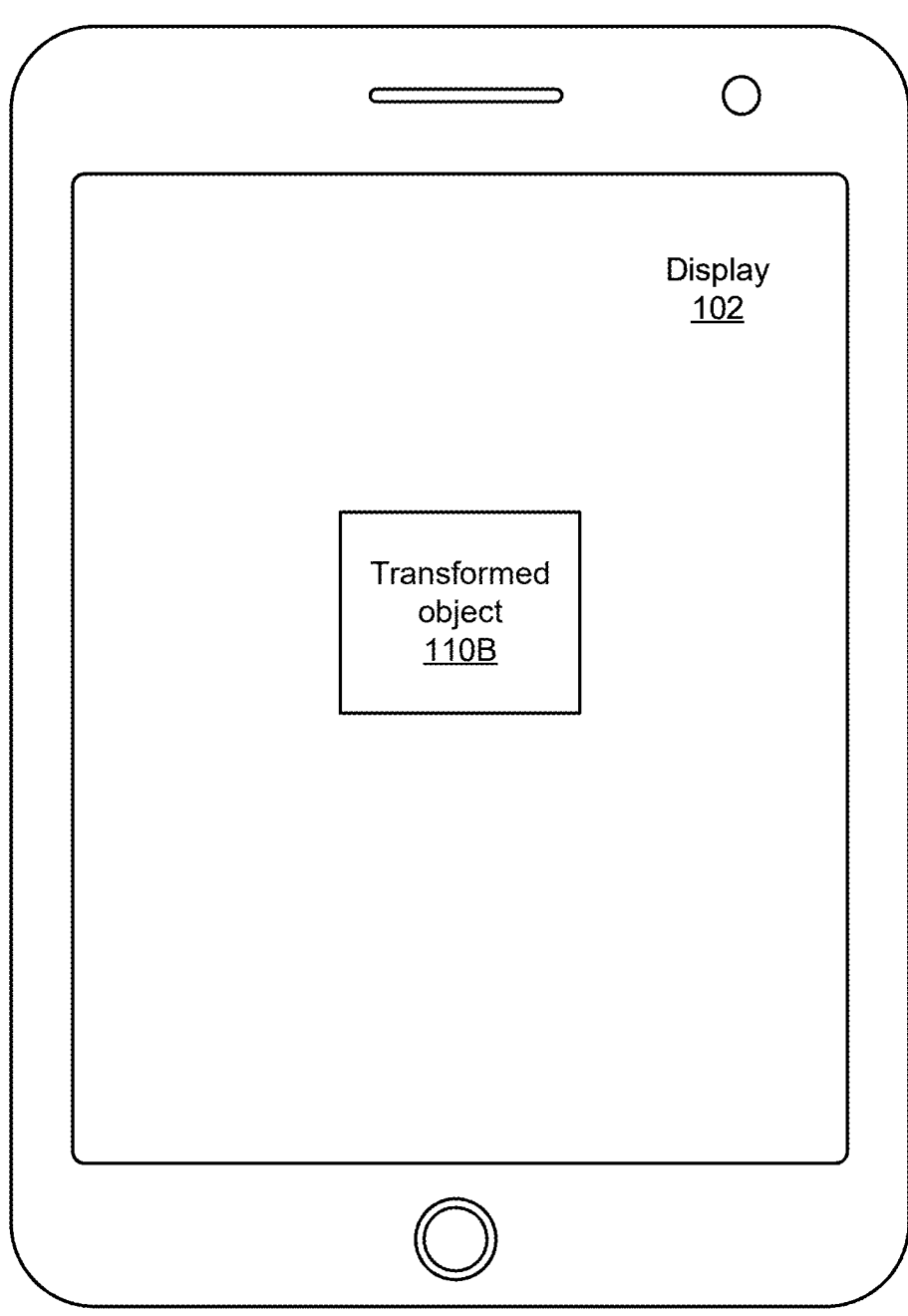
FIG. 1G shows the electronic device after the function has been performed on the second object.

FIG. 1G shows the electronic device 100 after the function has been performed on the second object 104B. The electronic device 100 can perform the function on the object 104B to generate the transformed object 110B presented by the display 102 in FIG. 1G in a similar manner to performing the function on the object 104A to generate the transformed object 110A described above.

Figure 2:
FIG. 2 is a block diagram of the electronic device.
Figure 2:
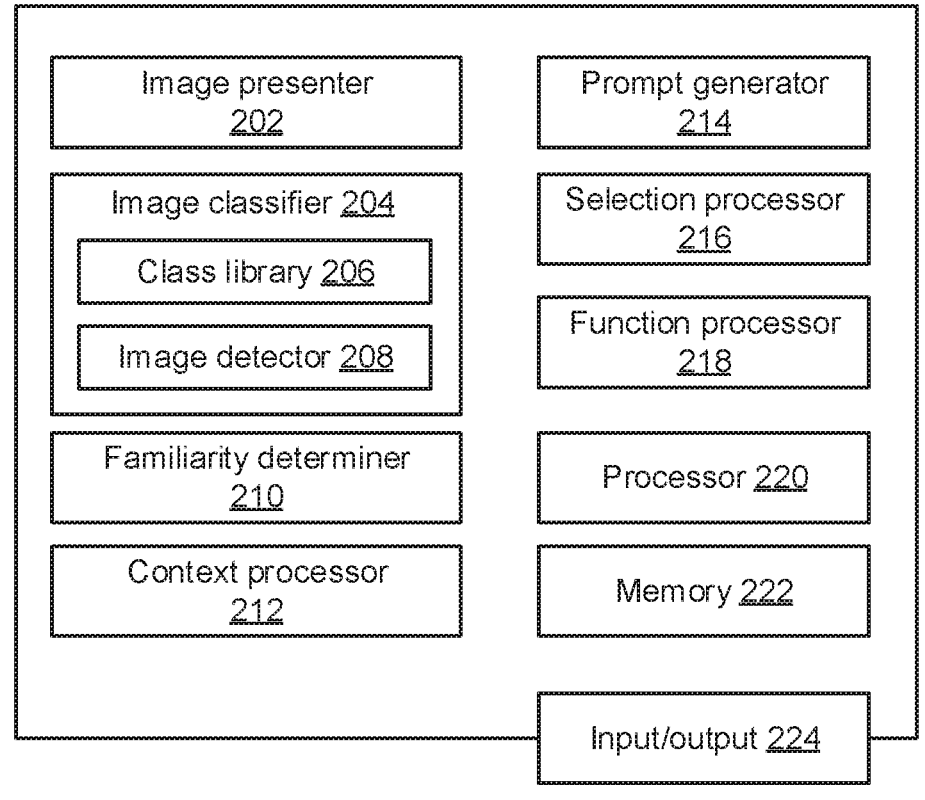

FIG. 2 is a block diagram of the electronic device 100. The electronic device 100 can include an image presenter 202. The image presenter 202 can generate and/or present images for the display 102 to present and/or display. The images can be generated based on data processed by an application running and/or executing on the electronic device 100, such as a web browser, a camera application, a video player, or a social media application, as non-limiting examples. The images generated and/or presented by the image presenter 202 can include objects, such as the objects 104A, 104B and/or transformed objects 110A, 110B.

The electronic device 100 can include an image classifier 204. The image classifier 204 can classify objects within images, and/or determine whether objects within images are members of object classes. In some examples, the image classifier 204 can determine whether objects within every frame of displayed images are members of object classes. In some examples, to reduce consumption of computing resources, the image classifier 204 can determine whether objects within every $n^{th}$ frame, such as every fourth frame, of displayed images are members of object classes. The image classifier 204 can determine whether objects within the displayed images are members of object classes by comparing features of the objects to features of the object classes. The image classifier 204 can determine whether the object within the displayed images are members of object classes by performing on-device machine learning techniques such as an artificial neural network, a convolutional neural network, a K nearest neighbor classification, a decision tree, or a support vector machine (SVM), as non-limiting examples. In some examples, the image classifier 204 can determine whether each object within a given displayed image, and/or whether multiple portions of the given displayed image, are members of multiple classes. In some examples, the image classifier 204 can sequentially determine whether objects and/or portions of the image are members of multiple different object classes.

The image classifier 204 can include, and/or can access, a class library 206. The class library 206 can include and/or store multiple object classes. The image classifier 204 can compare features of an object presented by the display 102, such as the objects 104A, 104B, to features of object classes stored in the class library 206, to determine whether the object is a member of the object class stored in the class library 206.

The image classifier 204 can include an image detector 208. The image detector 208 can detect a location on the display 102 of an object that the image classifier 204 has determined is a member of an object class. The location determined by the image detector 208 can be used by a prompt generator 214 to determine a location to present a prompt, such as the prompt 106.

The electronic device 100 can include a familiarity determiner 210. The familiarity determiner 210 can determine whether a user is familiar with, and/or a user's level of familiarity with, an object class and/or a function associated with the object class. The familiarity can be associated with the user and/or account that is logged in, active, and/or interacting with the electronic device 100. In some examples, the familiarity determiner 210 can generate a binary value for a user, indicating either that the user is not familiar with the object class and/or associated function and should be prompted to request the function to be performed on an object of the object class, or that the user is familiar with the object class and/or associated function and should not be prompted to request the function to be performed on the object of the object class. In some examples, the familiarity determiner 210 can generate one of multiple familiarity values within a range for a user, and the electronic device 100 can determine whether to present a prompt to the user based on a combination of a familiarity value and contextual information.

The familiarity determiner 210 can determine a familiarity value for the user with respect to each object class and/or function. The familiarity value can be based on a number of times and/or frequency that a prompt to perform a function, and/or a prompt with respect to an object of a given object class, has been presented to a user, with greater numbers and/or frequencies of prompts with respect to an object and/or object class increasing the familiarity value. The familiarity value can be based on a number of times that the user has selected an object of a given object class and/or with respect to a given function, with a greater number of times that a user has selected an object for the function to be performed on increasing the familiarity value with respect to the function and/or object class of the object. The familiarity value can be based on a length of time since the user has selected an object of a given object class and/or with respect to a given function, with a greater length of time since the user has selected an object of a given object class and/or with respect to a given function decreasing the familiarity value. In some examples, the electronic device 100 can determine that the user is sufficiently familiar with a function and/or object class associated with the function and stop and/or terminate performing image classification with respect to the object class and stop presenting prompts for the function associated with the object class, and then later, after the user has not selected an object of the object class and/or function associated with the object class for a length of time, determine that the user is no longer familiar with the function and/or object class associated with the function. Based on determining that the user is no longer familiar with the function and/or object class associated with the function, the electronic device 100 can resume performing image classification with respect to the image class and presenting prompts for the user to select an object of the object class to perform the function associated with the object class. The familiarity determiner 210 may control the termination of the classification if a predetermined first threshold for a familiarity value is reached and may control the resumption of the classification if a predetermined second threshold for the familiarity value is reached. This takes into account that the user might become familiar after some uses but loses that familiarity after some time of non-use. In one embodiment the first and second threshold may be identical.

The electronic device 100 can include a context processor 212. The context processor 212 can process context information that the electronic device 100 can combine with the familiarity value to determine whether to perform image classification and/or present a prompt. The context information can include, for example, status of computing resources such as a charge level of a battery included in the electronic device 100 (other examples of computing resources include availability of memory, processor resources, strength of connectivity to networks, or photographic modality), a time of day, audio signals received by a microphone included in the electronic device 100, a location of the electronic device 100, and/or the user's interest in images of a particular object class (such as humans or a specific type of animal such as dogs or cats) as shown by the user viewing images of the object class and/or storing images of the object class. If the charge level of the battery is low, then the electronic device 100 may not perform image classification despite the user not being familiar with a function and/or object class, to conserve battery power. If the time of day is a time when users may not be interested in performing particular functions, then the electronic device 100 may not perform image classification with respect to object classes associated with those particular functions despite the user not being familiar with those particular functions and/or object classes unless the familiarity value is very low, in which case the electronic device 100 may perform the image classification. If the audio signals indicate a particular environment, such as a coffee shop, then the electronic device 100 may perform image classification of object classes associated with the particular environment, such as coffee or menus, despite the user having a relatively high familiarity value with the object classes associated with the particular environment. If the user is in a particular location, such as a restaurant district, then the electronic device may perform image classification of objects of object classes associated with the particular location, such as signs and/or menus, despite the user being relatively familiar with the object classes associated with the particular location. If the electronic device 100 has determined that the user has a high interest in images of a particular object class, then the electronic device 100 may perform image classification of objects of the particular object class despite the user being relatively familiar with the object class and/or function associated with the object class.

The electronic device 100 can include a prompt generator 214. The prompt generator 214 can generate a prompt, such as the prompt 106 shown and described with respect to FIG. 1B, for the user to select an object for a function to be performed on. The prompt generator 214 can generate and/or display the prompt on the display 102 based on, and/or in response to, the image classifier 204 determining that an object is a member of an object class upon which the electronic device 100 can perform a function. The prompt generator 214 can generate the prompt in a location on the display 102 proximal to the object based on the location of the object determined by the image detector 208. The prompt can identify and/or describe (such as with text) the function to be performed on the object. The function to be performed can be associated with the object class of the object on which the function is to be performed.

The electronic device 100 can include a selection processor 216. The selection processor 216 can process a selection, such as either of the selections 108A, 108B, of an object, such as either of the objects 104A, 104B, that is a member of an object class associated with a function. The selection can include a gesture, such as a tap or a tap-and-hold gesture, on a portion of the display 102 that is presenting and/or displaying the selected object in examples in which the display 102 is a touchscreen, or a mouse click or double-click when a cursor is over the portion of the display 102 that is presenting and/or displaying the selected object. The selection processor 216 can determine whether input satisfies criteria for a predefined gesture with respect to an object presented by and/or displayed by the display 102. If the selection processor 216 determines that the input does satisfy the criteria for a predefined gesture with respect to the object presented by and/or displayed by the display 102, then the selection processor 216 can determine that the user has selected the object. Based on determining that the user has selected the object, the selection processor can prompt and/or instruct a function processor 218 to perform a function on and/or with respect to the object.

The electronic device 100 can include the function processor 218. The function processor 218 can perform the function on the object that the selection processor 216 determined that the user selected. The function processor 218 can perform, and/or select, a function based on the object class that the image classifier 204 determined that the object is a member of. The function processor 218 can pass the object into the function as a parameter. The object passed into the function as a parameter can include a portion of the image presented by the display 102. The portion of the image for the function processor 218 to pass into the parameter can be based on the location of the object determined by the image detector 208. The function performed and/or selected by the function processor can include, for example, initiating a telephone call to a telephone number included in the object, beginning drafting an email to an email address included in the object, decoding a barcode or QR code included in the object, performing optical character recognition on text included in the object, scanning a document included in and/or identified by the object, or identifying a person and/or human, animal, monument, or landmark included in the object. In some examples, the function processor 218 can perform the function locally on the electronic device 100. In some examples, the function processor 218 can perform the function by sending a request to the server, with the request including the object, such as by calling an application programming interface (API) with the object as a parameter, and receiving a transformed object from the server in response to sending the request. After performing the function, the function processor 218 can generate a transformed object, such as the transformed object 110A, 110B, for presentation and/or display by the display 102.

The electronic device 100 can include at least one processor 220. The at least one processor 220 can execute instructions, such as instructions stored in at least one memory device 222, to cause the electronic device 100 to perform any combination of methods, functions, and/or techniques described herein.

The electronic device 100 can include at least one memory device 222. The at least one memory device 222 can include a non-transitory computer-readable storage medium. The at least one memory device 222 can store data and instructions thereon that, when executed by at least one processor, such as the processor 220, are configured to cause a computing system such as the electronic device 100 to perform any combination of methods, functions, and/or techniques described herein. Accordingly, in any of the implementations described herein (even if not explicitly noted in connection with a particular implementation), software (e.g., processing modules, stored instructions) and/or hardware (e.g., processor, memory devices, etc.) associated with, or included in, the electronic device 100 can be configured to perform, alone, or in combination with the electronic device 100, any combination of methods, functions, and/or techniques described herein.

The electronic device 100 can include at least one input/output node 224. The at least one input/output node 224 can receive and/or send data, and/or can receive input and provide output from and to a user. The input and output functions may be combined into a single node, or may be divided into separate input and output nodes. The input/output node 224 can include, for example, a display (which can be a touchscreen display such as the display 102), a camera, a speaker, a microphone, one or more buttons, a motion detector and/or accelerometer, a thermometer, a light sensor, and/or one or more wired or wireless interfaces for communicating with other computing devices.

Figure 3:
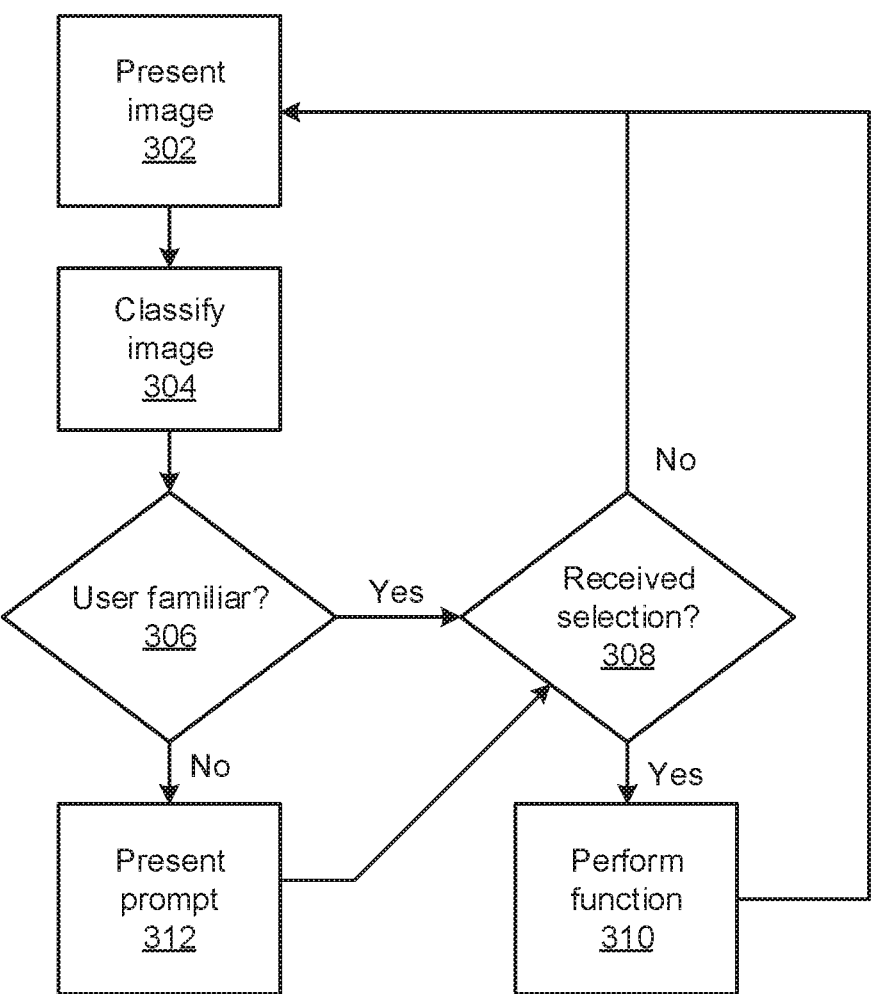
FIG. 3 is a flowchart of a method performed by the electronic device.

FIG. 3 is a flowchart of a method performed by the electronic device 100. FIG. 3 shows the electronic device 100 cycling performing image classification depending on whether the user is familiar with a function and/or object class associated with the function. The image presenter 202 can present an image (302). The image presenter 202 can present the image on the display 102. The image can be based on an application running on the electronic device, such as a web browser, a camera, or a social media application.

The image classifier 204 can classify the image (304), and/or portions of the image, presented by the display 102. The image classifier 204 can classify the image while the cycle for performing the image classification for a particular object class is on. The portions of the image can be considered objects such as objects 104A, 104B. The image classifier 204 can classify the image and/or objects by determining whether the image and/or objects are members of one or more object classes stored in the class library.

The familiarity determiner 210, in combination with the context processor 212, can determine whether the user is familiar (306) with the object class of the object and/or function associated with the object. The familiarity determiner 210, in combination with the context processor 212, can determine whether the user is familiar with the object class of the object and/or the function associated with the object based on a combination of one or more of the number of times that a prompt (such as prompt 106) has been presented to a user to perform the function on an object of the object class, how many times the user has selected an object of the object class, how much time has elapsed since the user has selected an object of the object class, a charge level of a battery included in the electronic device 100, a time of day, audio signals received by a microphone included in the electronic device 100, a location of the electronic device 100, and/or the user's interest in images of a particular object class as shown by the user viewing images of the object class and/or storing images of the object class, as non-limiting examples.

If the familiarity determiner 210, in combination with the context processor 212, determines that the user is familiar with the object class and/or function, then the electronic device 100 can cycle the image classification with respect to the object class and/or function off. Based on the familiarity determiner determining that the user is familiar with the object class and/or function, and/or cycling the image classification with respect to the object class and/or function off, the selection processor 216 can determine whether the electronic device 100 receives a selection (308) of the object, as described below. In some examples, if the familiarity determiner 210, in combination with the context processor 212, determines that the user is familiar with the object class and/or function, then the image classifier 204 can stop determining whether objects of the familiar object class are present based on the electronic device 100 cycling the image classification with respect to the object class and/or function off. If the familiarity determiner 210, in combination with the context processor 212, determines that the user is not familiar with the object class and/or function, and/or the image classification is cycled on with respect to the object class and/or function, then the prompt generator 214 can present the prompt (312) (and/or the electronic device 100 can cycle the image classification with respect to the object class and/or function on). The prompt, such as prompt 106, can indicate and/or describe the function to be performed on the object. The representation of the prompt can be based on the location of the object determined by the image detector 208 and the object class of the object and/or function to be performed on the object.

After presenting the prompt (312) and/or determining that the user is familiar with the object class and/or function, the electronic device 100 and/or selection processor 216 can determine whether the electronic device 100 received a selection of the object. The selection processor 216 can determine whether the electronic device 100 received a selection of the object based on whether the electronic device 100 received a predetermined gesture, such as a tap or tap and hold on the area of the display 102 presenting the object or a mouse click or double click when the cursor is over the area of the display 102 presenting the object.

If the selection processor 216 determines that the electronic device 100 did not receive a selection of the object, then the electronic device 100 can continue presenting the image (302). If the selection processor 216 determines that the electronic device 100 did receive a selection of the object, then the function processor 218 can perform the function (310) on the object. After performing the function (310), the electronic device 100 can continue presenting the image (302).

Figure 4:
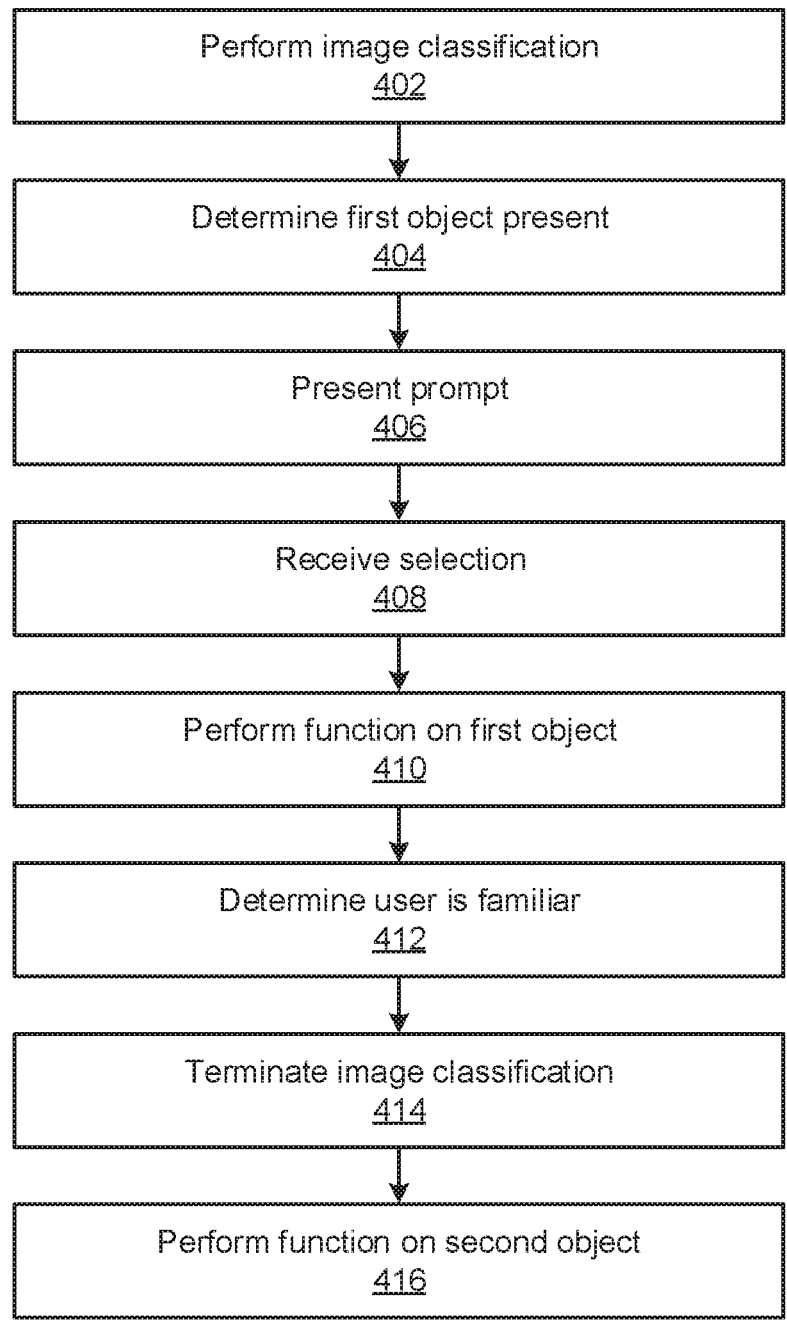
FIG. 4 is a flowchart of a method performed by the electronic device.

FIG. 4 is a flowchart of a method performed by the electronic device 100. The method can include perform image classification within a displayed image (402). The method can include, while performing the image classification, determining that a first object 104A of an object class is present within the displayed image (404). The method can include generating a prompt, such as presenting a prompt 106 within the displayed image (406). The method can include receiving, such as in response to the prompt 106, a selection 108A of the first object 104A from a user (408). The method can include, in response to receiving the selection of the first object 104A, performing a function on the first object 104A (410). The method can include, based on the selection of the first object 104A, which may be in response to the prompt 106, determining that the user is familiar with the function (412). The method can include, based on determining that the user is familiar with the function, terminating performing image classification within the displayed image (414). The method can include, in response to the user selecting a second object 104B of the object class within the displayed image, performing the function on the second object 104B (416).

In some examples, the performing the function on the first object can include performing a local image recognition function on the displayed image.

In some examples, the performing the function on the first object can include sending the displayed image to a server, and receiving a transformed object from the server.

In some examples, the object class can include text. In some examples, the function can include performing optical character recognition on the first object.

In some examples, the object class can include a barcode. In some examples, the function can include decoding the first object.

In some examples, the object class can include humans. In some examples, the function can include determining a name associated with the first object.

In some examples, the method can further include determining the object class based on a location of the computing system.

In some examples, the method can further include determining the object class based on images previously viewed by the user.

In some examples, the determination that the user is familiar with the function can include determining that the user is familiar with the function with respect to the object class, and the terminating performing image classification within the displayed image can include terminating performing image classification within the displayed image with respect to the object class.

In some examples, the terminating performing image classification within the displayed image can be based on determining that the user is familiar with the function and a time of day.

In some examples, the terminating performing image classification within the displayed image can be based on determining that the user is familiar with the function and a charge level of a battery included in the computing system.

In some examples, the terminating performing image classification within the displayed image can be based on determining that the user is familiar with the function and audio signals received by a microphone included in the computing system.

In some examples, the method can further include performing image classification on the second object in response to receiving the selection of the second object and determining that the second object is of the object class, and the performing the function on the second object can be based on the determining that the second object is of the object class.

In some examples, the method can further include performing image detection on the first object after determining that the first object of the object class is present within the displayed image. The presenting the prompt within the displayed image can include presenting a prompt in a location within the displayed image based on a location where the first object was detected within the displayed image.

In some examples, the method can further include displaying multiple additional images, based on the user not selecting portions of the displayed multiple additional images, determining that the user is no longer familiar with the function, and based on determining that the user is no longer familiar with the function, performing image classification within a subsequently displayed image, while performing the image classification within the subsequently displayed image, determining that a subsequent object of the object class is present within the subsequently displayed image, and presenting a subsequent prompt within the subsequently displayed image.

In some examples, the object class can include a first object class, the prompt can include a first prompt, and the function can include a first function. The method can further include performing image classification within a subsequently displayed image, while performing the image classification within the subsequently displayed image, detecting a second object of a second object class within the subsequently displayed image, the second object class being different than the first object class, presenting a second prompt within the subsequently displayed image, receiving a selection of the second object from the user, and in response to receiving the selection of the second object, performing a second function on the second object, the second function being different than the first function.

Figure 5:
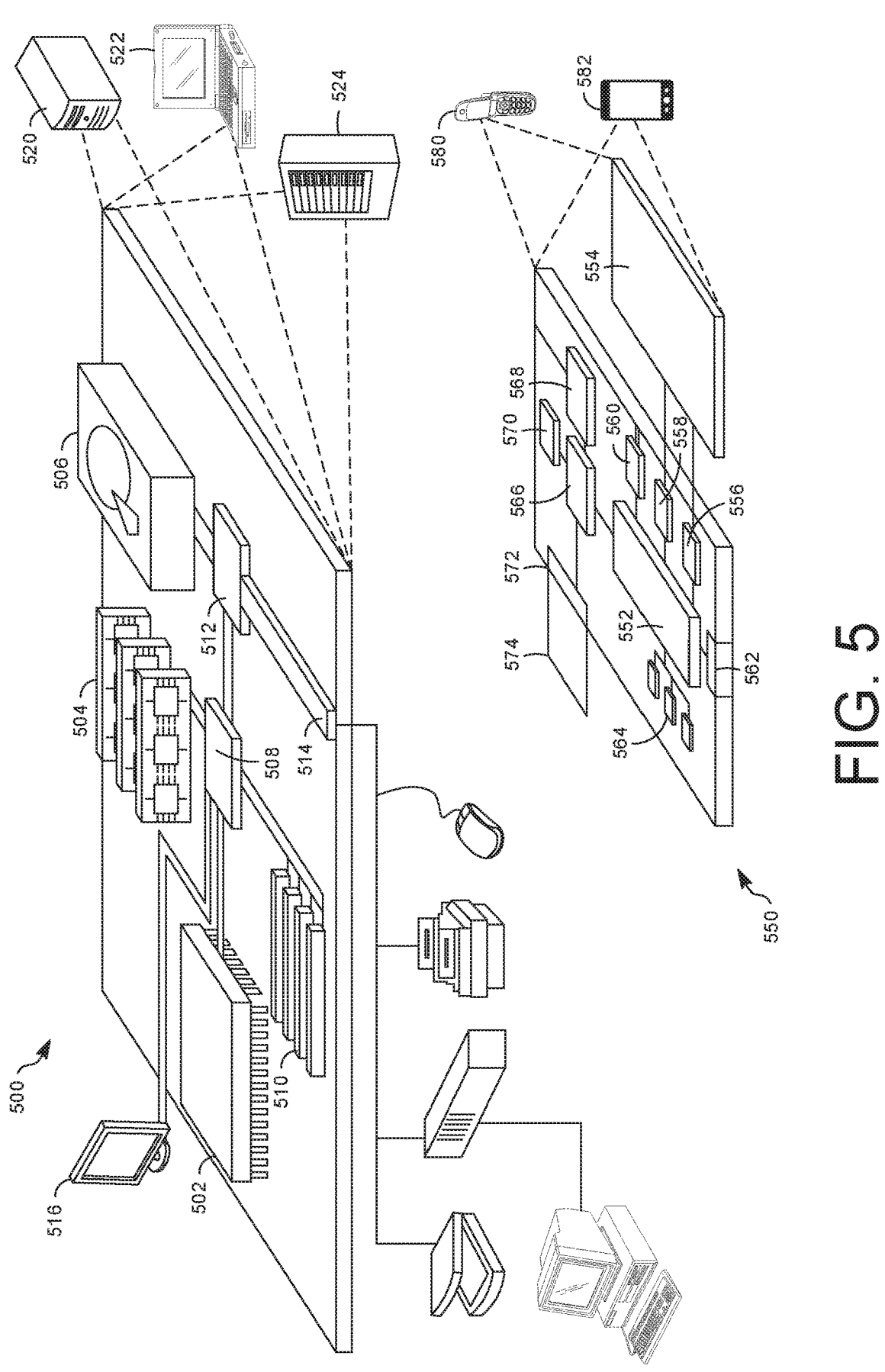
FIG. 5 shows an example of a computer device and a mobile computer device that can be used to implement the techniques described here.

FIG. 5 shows an example of a generic computer device 500 and a generic mobile computer device 550, which may be used with the techniques described here. Computing device 500 is intended to represent various forms of digital computers, such as laptops, desktops, tablets, workstations, personal digital assistants, televisions, servers, blade servers, mainframes, and other appropriate computing devices that can be in communication with the electronic device 100. Computing device 550 is intended to represent various forms of mobile devices, such as personal digital assistants, cellular telephones, smartphones, and other similar computing devices that can be an example of the electronic device 100. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. The processor 502 can be a semiconductor-based processor. The memory 504 can be a semiconductor-based memory. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In the following some examples are described.

Example 1: A non-transitory computer-readable storage medium comprising instructions stored thereon that, when executed by at least one processor, are configured to cause a computing system to:

perform image classification within a displayed image;

while performing the image classification, determine that a first object of an object class is present within the displayed image;

present a prompt within the displayed image;

receive, in response to the prompt, a selection of the first object from a user;

in response to receiving the selection of the first object, perform a function on the first object;

based on the selection of the first object in response to the prompt, determine that the user is familiar with the function;

based on determining that the user is familiar with the function, terminate performing image classification within the displayed image; and in response to the user selecting a second object of the object class within the displayed image, perform the function on the second object.

Example 2: The non-transitory computer-readable storage medium of example 1, wherein the performing the function on the first object comprises performing a local image recognition function on the displayed image.

Example 3: The non-transitory computer-readable storage medium of example 1 or 2, wherein the performing the function on the first object comprises:

sending the displayed image to a server; and receiving a transformed object from the server.

Example 4: The non-transitory computer-readable storage medium of at least one of the preceding examples, wherein the object class includes text.

Example 5: The non-transitory computer-readable storage medium of example 4, wherein the function includes performing optical character recognition on the first object.

Example 6: The non-transitory computer-readable storage medium of at least one of the preceding examples, wherein the object class includes a barcode.

Example 7: The non-transitory computer-readable storage medium of example 6, wherein the function includes decoding the first object.

Example 8: The non-transitory computer-readable storage medium of at least one of the preceding examples, wherein the object class includes humans.

Example 9: The non-transitory computer-readable storage medium of example 8, wherein the function includes determining a name associated with the first object.

Example 10: The non-transitory computer-readable storage medium of at least one of the preceding examples, wherein the instructions are further configured to cause the computing system to determine the object class based on a location of the computing system.

Example 11: The non-transitory computer-readable storage medium of at least one of the preceding examples, wherein the instructions are further configured to cause the computing system to determine the object class based on images previously viewed by the user.

Example 12: The non-transitory computer readable storage medium of at least one of the preceding examples, wherein with the electronic device it is determinable whether an object is of an object class, that the electronic device can perform a function on.

Example 13: The non-transitory computer readable storage medium of at least one of the preceding examples, wherein the determination of familiarity by a familiarity determiner depends on the number of selections of an object, in particular the number of selections of an object in a predetermined time interval and/or the time between the display of the object and the selection and—in particular—a familiarity value is generated.

Example 14: The non-transitory computer readable storage medium of example 13, wherein the familiarity determiner controls the termination of the classification if a predetermined first threshold for a familiarity value is reached and controls the resumption of the classification if a predetermined second threshold for the familiarity value is reached.

Example 15: The non-transitory computer readable storage medium of example 13 or 14, wherein a context processor processes context information that the electronic device can combine with the familiarity value to determine whether to perform or not perform image classification and/or present a prompt, the context information being in particular a charge level of a battery included in the electronic device, a time of day, an audio signal received by a microphone included in the electronic device, a location of the electronic device, and/or the user's interest in images of a particular object class as shown by the user viewing images of the object class and/or storing images of the object class.

Example 16: The non-transitory computer-readable storage medium of at least one of the preceding examples, wherein:

the determination that the user is familiar with the function comprises determining that the user is familiar with the function with respect to the object class; and the terminating performing image classification within the displayed image comprises terminating performing image classification within the displayed image with respect to the object class.

Example 17: The non-transitory computer-readable storage medium of at least one of the preceding examples, wherein the instructions are configured to cause the computing system to terminate performing image classification within the displayed image based on determining that the user is familiar with the function and a time of day.

Example 18: The non-transitory computer-readable storage medium of at least one of the preceding examples, wherein the instructions are configured to cause the computing system to terminate performing image classification within the displayed image based on determining that the user is familiar with the function and a charge level of a battery included in the computing system.

Example 19: The non-transitory computer-readable storage medium of at least one of the preceding examples, wherein the instructions are configured to cause the computing system to terminate performing image classification within the displayed image based on determining that the user is familiar with the function and audio signals received by a microphone included in the computing system.

Example 20: The non-transitory computer-readable storage medium of at least one of the preceding examples, wherein:

the instructions are further configured to cause the computing system to perform image detection on the first object after determining that the first object of the object class is present within the displayed image; and the presenting the prompt within the displayed image comprises presenting a prompt in a location within the displayed image based on a location where the first object was detected within the displayed image.

Example 21: The non-transitory computer-readable storage medium of at least one of the preceding examples, wherein the instructions are further configured to cause the computing system to:

display multiple additional images;

based on the user not selecting portions of the displayed multiple additional images, determine that the user is no longer familiar with the function; and based on determining that the user is no longer familiar with the function:

perform image classification within a subsequently displayed image;

while performing the image classification within the subsequently displayed image, determine that a subsequent object of the object class is present within the subsequently displayed image; and present a subsequent prompt within the subsequently displayed image.

Example 22: The non-transitory computer-readable storage medium of at least one of the preceding examples, wherein:

the object class comprises a first object class;

the prompt comprises a first prompt;

the function comprises a first function; and the instructions are further configured to cause the computing system to:

perform image classification within a subsequently displayed image;

while performing the image classification within the subsequently displayed image, detect a second object of a second object class within the subsequently displayed image, the second object class being different than the first object class;

present a second prompt within the subsequently displayed image;

receive a selection of the second object from the user; and in response to receiving the selection of the second object, perform a second function on the second object, the second function being different than the first function.

Example 23: An computing system comprising:

at least one processor; and the non-transitory computer-readable storage medium of any of examples 1-22.

Example 24: A method comprising:

performing, by a computing system, image classification within a displayed image;

while performing the image classification, determining that a first object of an object class is present within the displayed image;

presenting a prompt within the displayed image;

receiving a selection of the first from a user;

in response to receiving the selection of the prompt, performing a function on the first object;

based on the selection of the prompt, determining that the user is familiar with the function;

based on determining that the user is familiar with the function, terminating performing image classification within the displayed image; and in response to the user selecting a second object of the object class within the displayed image, performing the function on the second object.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A non-transitory computer-readable storage medium comprising instructions stored thereon that, when executed by at least one processor, are configured to cause a computing system to:

perform image classification within a displayed image;

while performing the image classification, determine that a first object of an object class is present within the displayed image;

present a prompt within the displayed image;

receive, in response to the prompt, a selection of the first object from a user;

in response to receiving the selection of the first object, perform a function on the first object;

based on the selection of the first object in response to the prompt, determine that the user is familiar with the function;

based on determining that the user is familiar with the function, terminate performing image classification within the displayed image; and in response to the user selecting a second object of the object class within the displayed image, perform the function on the second object.

2. The non-transitory computer-readable storage medium of claim 1, wherein the performing the function on the first object comprises performing a local image recognition function on the displayed image.

3. The non-transitory computer-readable storage medium of claim 1, wherein the performing the function on the first object comprises:

sending the displayed image to a server; and receiving a transformed object from the server.

4. The non-transitory computer-readable storage medium of claim 1, wherein the object class includes text.

5. The non-transitory computer-readable storage medium of claim 4, wherein the function includes performing optical character recognition on the first object.

6. The non-transitory computer-readable storage medium of claim 1, wherein:

the object class includes a barcode; and the function includes decoding the first object.

7. The non-transitory computer-readable storage medium of claim 1, wherein the object class includes humans.

8. The non-transitory computer-readable storage medium of claim 7, wherein the function includes determining a name associated with the first object.

9. The non-transitory computer-readable storage medium of claim 1, wherein the instructions are further configured to cause the computing system to determine the object class based on a location of the computing system.

10. The non-transitory computer-readable storage medium of claim 1, wherein the instructions are further configured to cause the computing system to determine the object class based on images previously viewed by the user.

11. The non-transitory computer-readable storage medium of claim 1, wherein the instructions are further configured to cause the computing system to determine whether an object is of an object class that the computing system can perform a function on.

12. The non-transitory computer-readable storage medium of claim 1, wherein the determination of familiarity by a familiarity determiner depends on a number of selections of an object.

13. The non-transitory computer-readable storage medium of claim 12, wherein the familiarity determiner controls the termination of the classification if a predetermined first threshold for a familiarity value is reached and controls resumption of the classification if a predetermined second threshold for the familiarity value is reached.

14. The non-transitory computer-readable storage medium of claim 12, wherein a context processor processes context information that the computing system can combine with a familiarity value to determine whether to perform or not perform image classification and/or present a prompt, the context information including a charge level of a battery included in the computing system, a time of day, an audio signal received by a microphone included in the computing system, a location of the computing system, or an interest of a user in images of a particular object class as shown by the user viewing images of the object class and/or storing images of the object class.

15. The non-transitory computer-readable storage medium of claim 1, wherein:

the determination that the user is familiar with the function comprises determining that the user is familiar with the function with respect to the object class; and the terminating performing image classification within the displayed image comprises terminating performing image classification within the displayed image with respect to the object class.

16. The non-transitory computer-readable storage medium of claim 1, wherein the instructions are configured to cause the computing system to terminate performing image classification within the displayed image based on determining that the user is familiar with the function and a time of day.

17. The non-transitory computer-readable storage medium of claim 1, wherein the instructions are configured to cause the computing system to terminate performing image classification within the displayed image based on determining that the user is familiar with the function and a charge level of a battery included in the computing system.

18. The non-transitory computer-readable storage medium of claim 1, wherein the instructions are configured to cause the computing system to terminate performing image classification within the displayed image based on determining that the user is familiar with the function and audio signals received by a microphone included in the computing system.

19. The non-transitory computer-readable storage medium of claim 1, wherein:

the instructions are further configured to cause the computing system to perform image detection on the first object after determining that the first object of the object class is present within the displayed image; and the presenting the prompt within the displayed image comprises presenting a prompt in a location within the displayed image based on a location where the first object was detected within the displayed image.

20. The non-transitory computer-readable storage medium of claim 1, wherein the instructions are further configured to cause the computing system to:

display multiple additional images;

based on the user not selecting portions of the displayed multiple additional images, determine that the user is no longer familiar with the function; and based on determining that the user is no longer familiar with the function:

perform image classification within a subsequently displayed image;

while performing the image classification within the subsequently displayed image, determine that a subsequent object of the object class is present within the subsequently displayed image; and present a subsequent prompt within the subsequently displayed image.

21. The non-transitory computer-readable storage medium of claim 1, wherein:

the object class comprises a first object class;

the prompt comprises a first prompt;

the function comprises a first function; and the instructions are further configured to cause the computing system to:

perform image classification within a subsequently displayed image;

while performing the image classification within the subsequently displayed image, detect a second object of a second object class within the subsequently displayed image, the second object class being different than the first object class;

present a second prompt within the subsequently displayed image;

receive a selection of the second object from the user; and in response to receiving the selection of the second object, perform a second function on the second object, the second function being different than the first function.

22. The non-transitory computer-readable storage medium of claim 1, wherein the instructions are further configured to cause the computing system to present the displayed image within a display of the computing system.

23. A computing system comprising:

at least one processor; and a non-transitory computer-readable storage medium comprising instructions stored thereon that, when executed by at least one processor, are configured to cause the computing system to:

perform image classification within a displayed image;

while performing the image classification, determine that a first object of an object class is present within the displayed image;

present a prompt within the displayed image;

receive, in response to the prompt, a selection of the first object from a user;

in response to receiving the selection of the first object, perform a function on the first object;

based on the selection of the first object in response to the prompt, determine that the user is familiar with the function;

based on determining that the user is familiar with the function, terminate performing image classification within the displayed image; and in response to the user selecting a second object of the object class within the displayed image, perform the function on the second object.

24. A method comprising:

performing, by a computing system, image classification within a displayed image;

while performing the image classification, determining that a first object of an object class is present within the displayed image;

presenting a prompt within the displayed image;

receiving a selection of the first object from a user;

in response to receiving the selection of the first object, performing a function on the first object;

based on the selection of the first object in response to the prompt, determining that the user is familiar with the function;

based on determining that the user is familiar with the function, terminating performing image classification within the displayed image; and in response to the user selecting a second object of the object class within the displayed image, performing the function on the second object.

25. A non-transitory computer-readable storage medium comprising instructions stored thereon that, when executed by at least one processor, are configured to cause a computing system to:

perform image classification within a first displayed image;

while performing the image classification, determine that a first object of an object class is present within the first displayed image;

present a prompt within the first displayed image;

receive a selection of the first object from a user;

in response to receiving the selection of the first object, perform a function on the first object;

based on the selection of the first object in response to the prompt, determine that the user is familiar with the function;

based on determining that the user is familiar with the function, present a second displayed image without performing image classification within the second displayed image; and in response to the user selecting a second object of the object class within the second displayed image, perform the function on the second object.

\* \* \* \* \*